United States Patent [19]

McFarland

[11] Patent Number: 5,173,181
[45] Date of Patent: Dec. 22, 1992

[54] POOL SKIMMING APPARATUS

[76] Inventor: Greg McFarland, 127 Wood Ave., Staten Island, N.Y. 10307

[21] Appl. No.: 541,597

[22] Filed: Jun. 21, 1990

[51] Int. Cl.⁵ .......................................... B01D 35/027
[52] U.S. Cl. ................................... 210/169; 210/236; 210/238; 210/249; 210/470; 210/473; 15/1.7; 4/490; 248/214; 248/231.4
[58] Field of Search ............... 210/169, 473, 236, 238, 210/249, 470; 15/1.7; 4/490; 248/214, 231.4; 43/7, 10

[56] References Cited

U.S. PATENT DOCUMENTS

| | | | |
|---|---|---|---|
| 3,220,037 | 11/1965 | Ruhling | 15/1.7 |
| 3,625,364 | 12/1971 | La Chance | 210/169 |
| 4,068,327 | 1/1978 | Heinlein | 210/169 |
| 4,089,074 | 5/1978 | Sermons | 210/169 |
| 4,140,634 | 2/1979 | Harry | 210/169 |
| 4,169,331 | 10/1979 | Baker | 15/1.7 |
| 4,247,216 | 1/1981 | Pansini | 15/1.7 |
| 4,369,109 | 1/1983 | Edge | 210/169 |
| 4,455,695 | 6/1978 | Mikhel | 210/169 |
| 4,781,827 | 11/1988 | Shields | 210/169 |
| 4,836,920 | 6/1989 | Miller, Jr. | 210/169 |
| 4,904,379 | 2/1990 | Ward | 210/169 |
| 5,048,222 | 9/1991 | Correll | 43/7 |

OTHER PUBLICATIONS

Skim-Wing—Advertisement for Skim-wing—Aqua Master, Newark, New Jersey.

*Primary Examiner*—Peter Hruskoci
*Assistant Examiner*—Robert James Popovics
*Attorney, Agent, or Firm*—Ostrolenk, Faber, Gerb & Soffen

[57] ABSTRACT

Apparatus for removing floating debris from the surface of a pool of liquid disposed in a container comprising a bracket adapted to be fastened adjacent a wall of the container and having an arm extending interiorly over the pool of liquid, the arm being adjustable horizontally and further comprising a vertically extending member directed perpendicularly with respect to the surface of the pool of liquid for receiving a strainer member, the strainer member comprising a net through which the liquid flows during circulation of the liquid. Preferably, the strainer member has a shaft receivable in the vertically extending member and the vertically extending member comprises a hollow cylinder having an interior diameter and at least two circumferentially disposed holes therein spaced apart, the shaft of the strainer member being receivable within the interior diameter of the hollow cylinder and having two spring loaded projections receivable in the holes in the cylinder for securing the strainer member thereto. The vertically extending member is adjustably disposed with respect to the surface of the pool such that the net will receive debris floating on the surface of the liquid as the liquid circulates in the pool. The strainer member is a conventional net normally utilized with a long pole for manual pool skimming, but which can be detached from the pole and attached to the bracket so as to be used to remove floating debris passively.

41 Claims, 3 Drawing Sheets

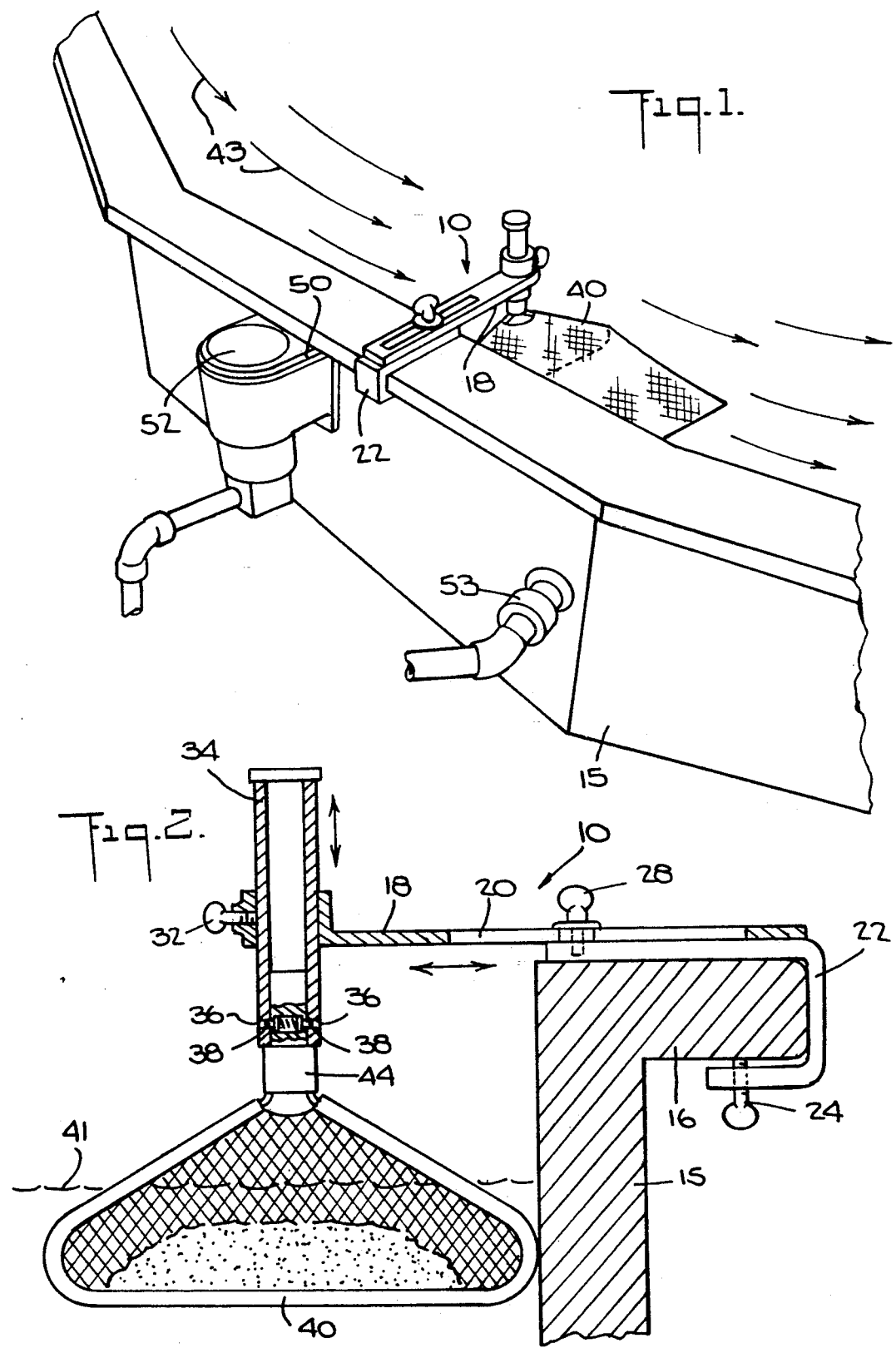

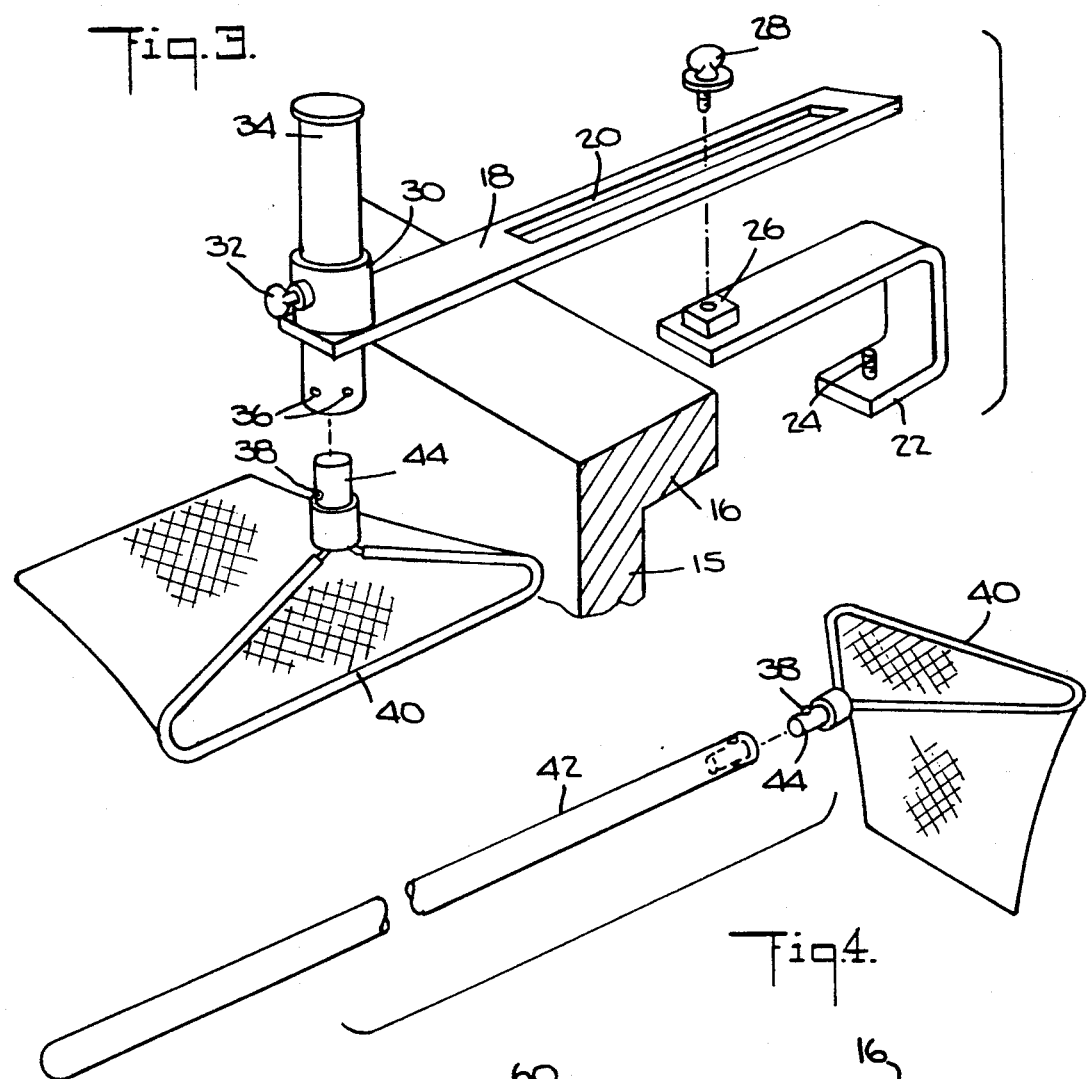
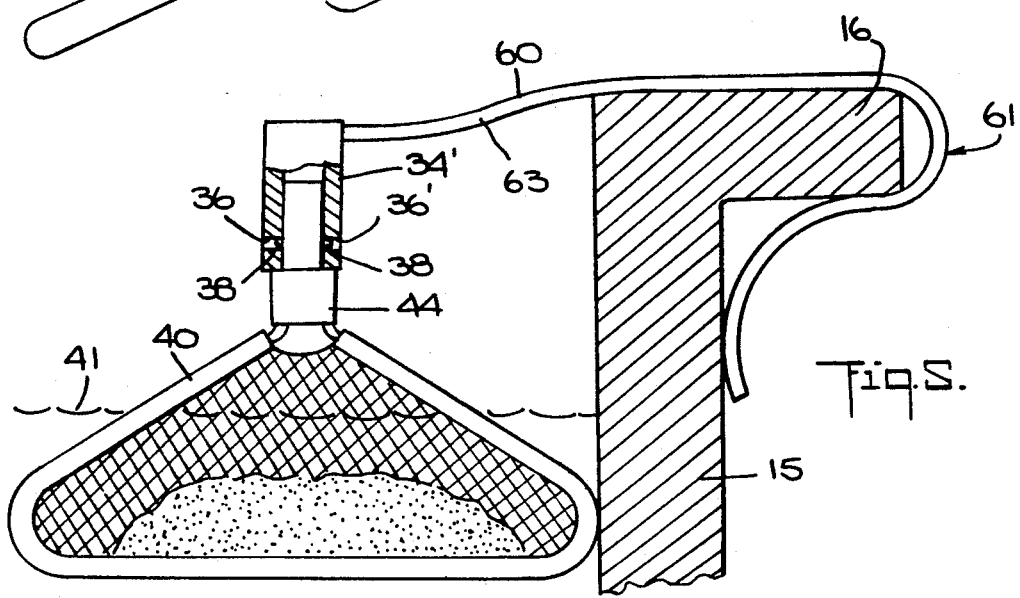

POOL SKIMMING APPARATUS

BACKGROUND OF THE INVENTION

The present invention relates to an apparatus for cleaning pools of liquid of floating debris, and in particular, to an apparatus for skimming the top surface of pools of, e.g., water, and the volume immediately below of floating debris. Even more particularly, the present invention relates to a novel bracket for mounting a pool skimming or strainer net alongside an edge of a pool in order to clear the pool of floating debris as the water circulates in the pool.

Applicant is aware of several patents directed to pool skimming apparatus.

U.S. Pat. No. 3,625,364 to LaChance discloses a skimming device for swimming pools comprising a pole having a V-shaped screen disposed over the pole adjacent the surface of the pool for collecting floating debris.

U.S. Pat. No. 4,068,327 to Heinlein discloses a swimming pool surface debris skimmer which comprises a skimmer bar projecting obliquely toward the direction from which normal circulation of water in the pool takes place such that it directs debris toward a pool skimmer pocket.

U.S. Pat. No. 4,140,634 to Harry discloses a swimming pool skimmer shield for shielding the skimmer mouth in the wall of a swimming pool to prevent the introduction of floating debris from the water surface through the skimmer mouth into the existing water filtration system of the swimming pool.

U.S. Pat. No. 4,455,695 to Mikhel discloses a guiding unit for swimming pool cleaners comprising a guide bar disposed along the surface of the water held against lateral deviation by tie bars whose end portions are removably connected to the guide bar and the pool wall.

U.S. Pat. No. 4,836,920 to Miller, Jr. discloses a recoil web pool skimmer which retractably recoils when not in use.

The above patents show various types of skimming devices for cleaning pools of water of floating debris. None of these devices, however, disclose or suggest a pool skimming device which utilizes a convenient bracket easily adaptable to various types of swimming pools and employing a conventional pool skimming net of the type normally releasably employed at the end of a long pole for manually skimming a pool, which is attachable to the bracket so that when a conventional skimming net is not being used at the end of a skimming pole for manual cleaning, it can be removed from the pole and employed usefully by affixing it to the bracket to perform a skimming function unattended and passively as the water circulates in the pool.

SUMMARY OF THE INVENTION

Accordingly, it is an object of the present invention to provide an apparatus for skimming pools of liquid of surface debris as the liquid circulates through the pool.

It is yet still a further object of the present invention to provide a bracket for attaching to a side of a pool and to which a net or strainer device can be attached for collecting debris floating on the surface of the pool during circulation of the liquid in the pool.

It is yet still a further object of the present invention to provide a pool skimming apparatus employing a bracket attachable to a side of a pool to which a conventional net or skimmer device typically employed at the end of a long pole for manual skimming of a pool, can be attached.

It is yet still a further object of the present invention to provide a pool skimming device such that when a user is not manually skimming a surface of a pool with a net attachable to a long pole, the net structure can be detached from the pole and attached to a bracket of the pool skimming apparatus in accordance with the present invention so that during circulation of the water in the pool, the pool can be continuously cleaned of floating debris.

It is a further object to provide such a pool skimming device which is inexpensive, simple to install and easily removeable.

It is yet still a further object to provide such a pool skimming device which utilizes a conventional pool skimmer net attachable to the bracket of the device by conventional spring loaded projections received in apertures in the bracket.

The above and other objects of the present invention are achieved by an apparatus for removing floating debris from the surface of a pool of liquid disposed in a container comprising a bracket adapted to be fastened adjacent a wall of the container and having an arm extending interiorly over the pool of liquid, the arm being adjustable horizontally and further comprising a vertically extending member directed perpendicularly with respect to the surface of the pool of liquid for receiving a strainer member, the strainer member comprising a net through which the liquid flows during circulation of the liquid, the strainer member and the vertically extending member having mating coupling members for releasably coupling the vertically extending member and the strainer member together, the vertically extending member being adjustably disposed with respect to the arm such that the net will receive debris floating on the surface of the liquid as the liquid circulates in the pool.

According to a preferred embodiment of the present invention, the objects are achieved by an apparatus for removing floating debris from the surface of a pool of liquid disposed in a container comprising a bracket adapted to be fastened adjacent a wall of the container and having an arm extending interiorly over the pool of fluid, the arm being adjustable horizontally and further comprising a vertically extending member directed perpendicularly with respect to the surface of the pool of liquid for receiving a strainer member, the strainer member comprising a net through which the liquid flows during circulation of the liquid, the strainer member and the vertically extending member having mating coupling members for releasably coupling the vertically extending member and the strainer member together, one of the coupling members comprising a hollow cylinder having an interior diameter and at least two circumferentially disposed holes therein spaced apart and the other coupling member comprising a shaft, the shaft being receivable within the interior diameter of the hollow cylinder and having at least two spring loaded projections receivable in the holes in the cylinder for securing the strainer member to the vertically extending member, the vertically extending member being adjustably disposed with respect to the arm such that the net will receive debris floating on the surface of the liquid as the liquid circulates in the pool.

It is yet still a further object of the present invention to provide apparatus for removing floating debris from the surface of a pool of liquid disposed in a container comprising a bracket adapted to be fastened adjacent a wall of the container and having an arm extending interiorly over the pool of liquid, the arm being adjustable horizontally and further comprising a vertically extending member directed perpendicularly with respect to the surface of the pool of liquid for receiving a strainer member, the strainer member comprising a net through which the liquid flows during circulation of the liquid, the strainer member having a shaft receivable in the vertically extending member, the vertically extending member comprising a hollow cylinder having an interior diameter and at least two circumferentially disposed holes therein spaced apart, the shaft of the strainer member being receivable within the interior diameter of the hollow cylinder and having two spring loaded projections receivable in the holes in the hollow cylinder for securing the strainer member thereto, the vertically extending member being adjustably disposed with respect to the arm such that the net will receive debris floating on the surface of the liquid as the liquid circulates in the pool.

It is yet still a further object of the present invention to provide a bracket adaptable for receiving a strainer member for removing floating debris from the surface of a pool of liquid disposed in a container comprising an arm adapted to be fastened adjacent a wall of the container and extending interiorly over the pool of liquid, the arm being adjustable horizontally and further comprising a vertically extending member directed perpendicularly with respect to the surface of the pool of liquid adapted to receive the strainer member through which the liquid flows during circulation of the liquid, the vertically extending member and the strainer member having mating coupling members for releasably coupling the vertically extending member to the strainer member, the vertically extending member being adjustably disposed with respect to the arm such that the strainer member will receive debris floating on the surface of the liquid as the liquid circulates in the pool.

According to a preferred embodiment, the present invention provides a bracket adaptable for receiving a strainer member for removing floating debris from the surface of a pool of liquid disposed in a container comprising an arm adapted to be fastened adjacent a wall of the container and extending interiorly over the pool of liquid, the arm being adjustable horizontally and further comprising a vertically extending member directed perpendicularly with respect to the surface of the pool of liquid adapted to receive the strainer member through which the liquid flows during circulation of the liquid, the vertically extending member having a coupling member adapted to receive a mating coupling member of the strainer member for releasably coupling the strainer member to the vertically extending member, one of the coupling members comprising a hollow cylinder having an interior diameter and at least two circumferentially disposed holes therein spaced apart, the other coupling member comprising a shaft receivable within the interior diameter of the hollow cylinder and having two spring loaded projections receivable in the holes in the hollow cylinder for securing the strainer member to the vertically extending member, the vertically extending member being adjustably disposed with respect to the arm such that the strainer member will receive debris floating on the surface of the liquid as the liquid circulates in the pool.

Preferably, the coupling member of the vertically extending member comprises the hollow cylinder into which the shaft of a strainer member having two spring loaded projections is received.

Other objects, features and advantages of the invention will be apparent from the detailed description which follows.

BRIEF DESCRIPTION OF THE DRAWING

The invention will be described in greater detail in the following detailed description with reference to the drawings in which:

FIG. 1 shows a perspective view of one embodiment of a pool skimming apparatus according to the present invention employed in an above-ground pool;

FIG. 2 shows the pool skimming apparatus shown in FIG. 1 in cross section;

FIG. 3 shows the pool skimming apparatus of FIGS. 1 and 2 in an exploded view;

FIG. 4 shows the net utilized in conjunction with the bracket of the pool skimming apparatus of the present invention used in its conventional manner with a long pole for manual skimming of pool;

FIG. 5 shows a second embodiment of a pool skimming apparatus according to the present invention;

DETAILED DESCRIPTION

Figure 6:
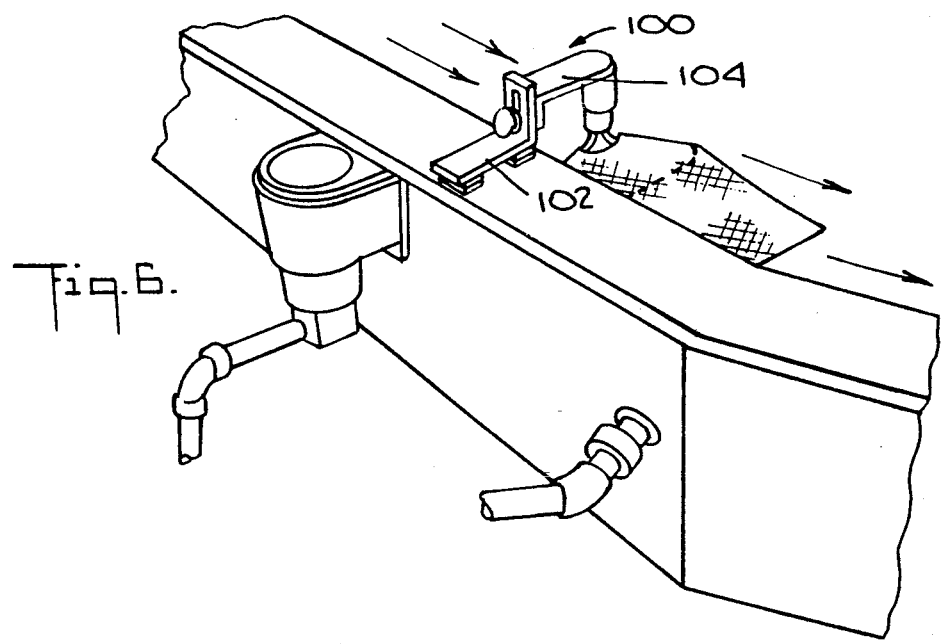
FIG. 6 shows a third embodiment of a pool skimming apparatus according to the present invention in a perspective view mounted in an above-ground pool.

With reference now to the drawings, the present invention according to a first embodiment comprises a bracket assembly 10 which is adapted to be mounted to the side of a pool. The bracket comprises an arm extending toward the interior of the pool. Preferably, the arm is adjustable so the amount of extension may be varied As shown more clearly in FIG. 3 for an above-ground pool having a side wall 15 and ledge 16, one mechanism for accommodating this extension comprises making the arm 10 of two components, a first of which comprises extending member 18 having a longitudinal slot 20 disposed therein. The member 18 is attachable to a bracket 22 which is received over the ledge 16 of the pool, and is fixed to the ledge of the pool by a suitable fastening means such as a wing screw 24, as shown most clearly in FIG. 2. Bracket 22 includes a threaded nut or boss 26 which is received in the slot 20 of member 18. The threaded nut or boss 26 receives a suitable wing screw 28 for securing the member 18 to the bracket 22 in the amount of the desired extension. At the end of the member 18 directed toward the interior of the pool, the member 18 is provided with a collar 30, in which a hollow shaft 34 is received. The collar 30 has a suitable fastening means for securing the shaft 34 in a desired vertical position above the surface of the water in the pool. The shaft 34 has a plurality, preferably four, of apertures 36 disposed at 90° intervals at its lower end facing the water surface. Although 4 holes are preferably provided, 2 holes, spaced at 180°, may be provided Apertures 36 receive spring-loaded projections 38 of the shaft of a conventional pool skimming net 40, which typically is adapted to be received at the end of an extended pole member 42 for use by an individual manually skimming the surface of a pool, as well known to those skilled in the art. Projections 38 are spring loaded into a hollow cylindrical shaft section 44 of net 40, the cylindrical section 44 being sized such as to have an outer diameter which is receivable within the interior of the hollow shaft 34, i.e., the outer diameter of cylinder 44 is less than the inner diameter of shaft 34 such that it can be easily received therein and locked in place by detented action of the projections 38 into respective ones of the apertures 36.

As would be evident to a person of skill in the art, the coupling members could be reversed such that the shaft with the holes 36 could be provided on the pool skimming net and the spring loaded projections 38 provided on the hollow shaft 34. Furthermore, other suitable releasable coupling means could be provided.

With reference to FIG. 1, the invention is used such that the device 10 is disposed at the edge of a pool, adjacent the water surface. Although the invention is shown attached to the edge of an above-ground pool, it is equally applicable to other types of pools, for example in-ground pools, as will be explained in more detail below with reference to other embodiments. In the embodiment shown in FIG. 1, the device 10 is disposed so that it is attached to the side of a pool such that the member 18 is suitably extended to allow the net 40 to clear the sidewall 15 of the pool. The vertical shaft 34 is then adjusted such that the net 40 is disposed such that the surface 41 of the water lies within the cross-sectional area of the net, as shown most clearly in FIG. 2. This is done by suitable adjustment of wing screws 28 and 32. As the water circulates in the pool, floating debris will be collected over time within the net 40. FIG. 1 shows the typical circulation by the arrows 43 of the water along the perimeter of a round or oval pool. Although the pool skimming apparatus according to the present invention can be employed anywhere along the side of a pool, it is preferably disposed adjacent the inlet opening 50 of the pool filtration system such that it collects only debris which has not been collected by the built-in filter 52 normally disposed at the inlet opening 50. In FIG. 1, the filter outlet is shown at 53.

The invention can be employed with pools of any construction, for example, round pools, oval pools, square pools, rectangular pools, or even pools of irregular shapes, so long as it it disposed at a point in the pool where water circulates.

FIG. 5 shows another embodiment of the present invention employing a flexible member 60 which is bendable into shape over the ledge 16 of the pool. Preferably, the member 60 may be encased in an elastomeric material, for example, rubber or a suitable polymer. The member 60 is made of a material which is bendable and which retains its shape once bent. At the end of member 60 directed toward the interior of the pool, a cylindrical shaft 34' is again disposed having apertures 36, for receiving detenting projections 38 attached to shaft 44 of net structure 40. To use the design shown in FIG. 5, the user bends the arm 60 at 61 so that it suitably extends over the side 15 of the pool into the interior of the pool with enough clearance for net 40 and at 63 so that the net is at the correct level so that the water surface 41 is disposed within the interior of the net 40, thus allowing the net to collect floating debris. Again, the holes 36' and detenting projections 38 may be reversed so that the holes 36' are provided in the net structure and the detenting projections provided on the shaft 34.

Figure 7:
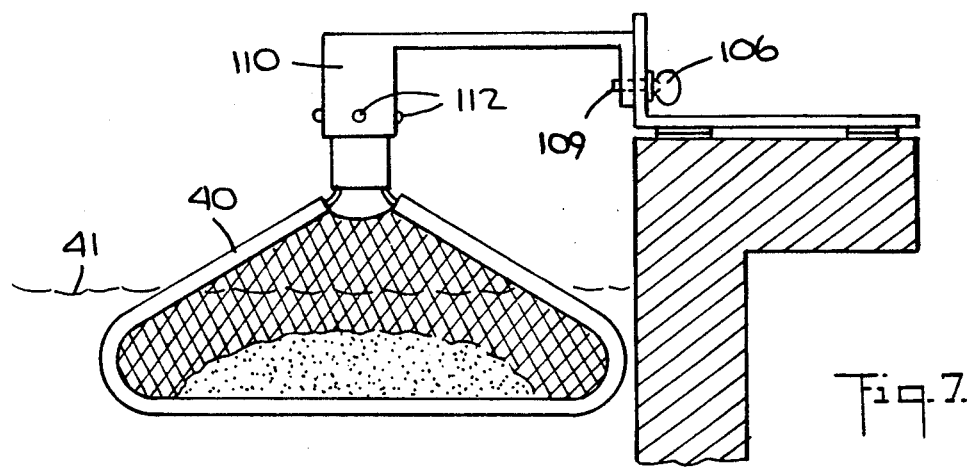
FIG. 7 shows the pool skimming apparatus according to FIG. 6 in a cross-sectional view.
Figure 8:
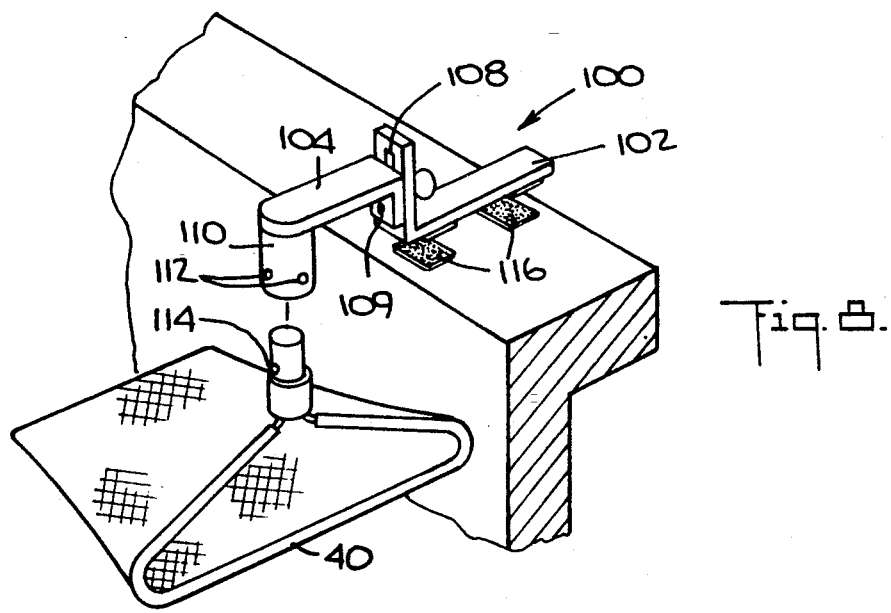
FIG. 8 shows the pool skimming apparatus according to FIGS. 6 and 7 in an exploded view.

According to a further embodiment, shown in FIGS. 6 through 8, and useful for above-ground pools and also pools not having a ledge, for example, in-ground pools which are surrounded by, for example, a deck area, net 40 is maintained in a suitable position with respect to the water surface 41 of the pool and the wall of the pool by a bracket generally designated by 100, and comprising a first arm 102 having an L-shape and a second arm 104 coupled to the arm 102 by suitable fastening means, for example, a wing screw 106. Arm 102 is provided with a slot 108 in an upwardly-extending portion of the arm through which the wing screw 106 may be inserted and which wing screw is receivable in a suitable nut 109 or threaded aperture in arm 104, for adjusting the vertical position of the net 40. Arm 104 includes a hollow cylindrical section 110 comprising 2 to 4 apertures 112 for receiving detented projections 114 of the net 40 for securing the net in proper position with respect to the water surface 41. The horizontal extension of the net 40 over the pool surface 41 may be adjusted with suitable fastening means, e.g., by disposing suitable hook and loop fastening strips 116 on the surface area adjacent the pool opening, as shown in FIGS. 7 and 8. These fastening strips may be, for example, hook and loop type fastener strips such as Velcro strips. These fastening strips allow very convenient adjustment and easy removal of the device 100 from the side of the pool when not in use.

As with the other embodiments, the location of the apertures 112 and spring loaded detenting projections 114 can be reversed so that they appear on opposite parts than shown in the figures.

The present invention provides a novel apparatus for skimming debris from a pool surface, and in particular, allows a conventional net having detented projections and which is normally fastened to an extended pole for manual skimming of the pool surface, to be employed in a passive manner in a pool along the side of a pool for skimming the pool surface of debris when the pool net 40 would otherwise not be in use.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for removing floating debris from the surface of a pool of liquid disposed in a container comprising:
   - a bracket constructed and arranged to be fastened adjacent a wall of the container and having an arm extending interiorly over the pool of liquid, said arm being adjustable horizontally and further comprising a vertically extending member directed perpendicularly with respect to the surface of the pool of liquid releasably holding strainer member, the strainer member comprising a net through which the liquid flows during circulation of the liquid, the strainer member and the vertically extending member having mating coupling member releasably coupling the vertically extending member and the strainer member together, said vertically extending member being adjustably disposed with respect to the arm such that the net will receive debris floating on the surface of the liquid as the liquid circulates in the pool, said mating coupling members comprising mating quick disconnect means on the vertically extending member and the strainer member such that said strainer member having said quick disconnect means can be removed from said bracket when straining has been completed, so that the strainer member can be removed from the container of liquid and used releasably secured with said quick disconnect means to a pole having corresponding coupling means for use in manual straining of said pool of liquid.

2. The apparatus recited in claim 1, wherein one of the coupling members comprise a hollow cylinder having an interior diameter and at least two circumferentially disposed holes therein spaced apart and the other coupling member comprises a shaft, the shaft being receivable within the interior diameter of the hollow cylinder and having at least two spring loaded projections receivable in the holes in the hollow cylinder for securing the strainer member to the vertically extending member.

3. The apparatus recited in claim 2, wherein the hollow cylinder is disposed on the vertically extending member and the shaft is disposed on the strainer member.

4. The apparatus recited in claim 2, wherein said two holes are spaced apart 180°.

5. The apparatus recited in claim 4, wherein said hollow cylinder has four holes disposed 90° apart around the circumference of the cylinder for receiving the two spring loaded projections of the shaft.

6. The apparatus recited in claim 1, wherein said arm extending interiorly is fastened to said vertically extending member such that said vertically extending member can be adjusted vertically with respect to said arm.

7. The apparatus recited in claim 6, wherein said arm comprises an L-shaped member having a vertically extending leg extending toward the pool of liquid to which said vertically extending member is attached.

8. The apparatus recited in claim 7, wherein said vertically extending member is adjustably receivable in an opening directed toward the pool of liquid in said vertically extending leg of said L-shaped member.

9. The apparatus recited in claim 6, wherein said arm extending interiorly is horizontally adjustable.

10. The apparatus recited in claim 9, wherein said arm extending interiorly comprises first and second sections adjustable horizontally with respect to each other.

11. The apparatus recited in claim 9, further comprising means for fastening said arm adjacent said pool surface.

12. The apparatus recited in claim 11, wherein said fastening means comprises hook and loop fastening strips disposed on said arm and on a surface adjacent said pool.

13. The apparatus recited in claim 6, wherein said arm extending interiorly is horizontally adjustable.

14. The apparatus recited in claim 13, wherein said arm extending interiorly comprises first and second sections adjustable horizontally with respect to each other.

15. The apparatus recited in claim 13, further comprising means for fastening said arm adjacent said pool surface.

16. The apparatus recited in claim 15, wherein said fastening means comprises hook and loop fastening strips disposed on said arm and on a surface adjacent said pool.

17. The apparatus recited in claim 1, wherein said arm extending interiorly is flexible such that said arm can be bent so as to adjust the vertical and horizontal position of said strainer member.

18. Apparatus for removing floating debris from the surface of a pool of liquid disposed in a container comprising:
a bracket constructed and arranged to be fastened adjacent a wall of the container and having an arm extending interiorly over the pool of liquid, said arm being adjustable horizontally and further comprising a vertically extending member directed perpendicularly with respect to the surface of the pool of liquid releasably holding a strainer member, the strainer member comprising a net through which the liquid flows during circulation of the liquid, the strainer member having a shaft receivable in the vertically extending member, the vertically extending member comprising a hollow cylinder having an interior diameter and at least two circumferentially disposed holes therein spaced apart, the shaft of the strainer member being releasably connected within the interior diameter of the hollow cylinder and having two spring loaded projections receivable in the holes in the hollow cylinder for securing the strainer member thereto, said vertically extending member being adjustably disposed with respect to the arm such that the net will receive debris floating on the surface of the liquid as the liquid circulates in the pool, the circumferentially spaced holes on the cylinder and the projections on the shaft comprising mating quick disconnect means such that said strainer member having said quick disconnect means can be removed from said bracket when straining has been completed, so that the strainer member can be removed from the container of liquid and used releasably secured with said quick disconnect means to a pole having corresponding coupling means for use in manual straining of said pool of liquid.

19. The apparatus recited in claim 18, wherein said arm extending interiorly is fastened to said vertically extending member such that said vertically extending member can be adjusted vertically with respect to said arm.

20. The apparatus recited in claim 19, wherein said arm comprises an L-shaped member having a vertically extending leg extending toward the pool of liquid to which said vertically extending member is attached.

21. The apparatus recited in claim 20, wherein said vertically extending member is adjustable receivable in an opening directed toward the pool of liquid in said vertically extending leg of said L-shaped member.

22. The apparatus recited in claim 18, wherein said arm extending interiorly is flexible such that said arm can be bent so as to adjust the vertical and horizontal position of said strainer member.

23. The apparatus recited in claim 18, wherein said two holes are spaced apart 180°.

24. The apparatus recited in claim 23, wherein said hollow cylinder member has four holes disposed 90° apart around the circumference of the cylinder for receiving the two spring load projections of the shaft of the net.

25. A bracket constructed and arranged for receiving a strainer member for removing floating debris from the surface of a pool of liquid disposed in a container comprising:

an arm constructed and arranged to be fastened adjacent a wall of the container and extending interiorly over the pool of liquid, said arm being adjustable horizontally and further comprising a vertically extending member directed perpendicularly with respect to the surface of the pool of liquid constructed and arranged to receive the strainer member through which the liquid will flow during circulation of the liquid, the vertically extending member and the strainer member having mating coupling members for releasably coupling the vertically extending member to the strainer member, said vertically extending member being adjustably disposed with respect to the arm such that the strainer member will receive debris floating on the surface of the liquid as the liquid circulates in the pool, said mating coupling means comprising quick disconnect means on the vertically extending member and the strainer member, such that said strainer member having said quick disconnect means can be removed from said arm when straining has been completed, so that the strainer member can be removed from the container of liquid and used releasably secured with said quick disconnect means to a pole having corresponding coupling means for use in manual straining of said pool of liquid.

26. The bracket recited in claim 25, wherein one of the coupling members comprises a hollow cylinder having an interior diameter and at least two circumferentially disposed holes therein spaced apart and the other coupling member is receivable within the interior diameter of the hollow cylinder and has two spring loaded projections receivable in the holes in the hollow cylinder for securing the strainer member to the vertically extending member.

27. The bracket recited in claim 26, wherein the hollow cylinder is disposed on the vertically extending member and the shaft is disposed on the strainer member.

28. The bracket recited in claim 25, wherein said arm extending interiorly is fastened to said vertically extending member such that said vertically extending member can be adjusted vertically with respect to said arm.

29. The bracket recited in claim 28, wherein said arm comprises an L-shaped member having a vertically extending leg extending toward the pool of liquid to which said vertically extending member is attached.

30. The bracket recited in claim 29, wherein said vertically extending member is adjustably receivable in an opening directed toward the pool of liquid in said vertically extending leg of said L-shaped member.

31. The bracket recited in claim 28, wherein said arm extending interiorly is horizontally adjustable.

32. The bracket recited in claim 31, wherein said arm extending interiorly comprises first and second sections adjustable horizontally with respect to each other.

33. The bracket recited in claim 31, further comprising means for fastening said arm adjacent said pool surface.

34. The bracket recited in claim 33, wherein said fastening means comprises hook and loop fastening strips disposed on said arm and on a surface adjacent said pool.

35. The bracket recited in claim 25, wherein said two holes are spaced apart 180°.

36. The bracket recited in claim 35, wherein said hollow cylinder member has four holes disposed 90 apart around the circumference of the cylinder for receiving the two spring load projections of the shaft.

37. A bracket constructed and arranged for receiving a strainer member for removing floating debris from the surface of a pool of liquid disposed in a container comprising:

an arm constructed and arranged to be fastened adjacent a wall of the container and extending interiorly over the pool of liquid, said arm being adjustable horizontally and further comprising a vertically extending member directed perpendicularly with respect to the surface of the pool of liquid constructed and arranged to receive the strainer member through which the liquid will flow during circulation of the liquid, the vertically extending member and the strainer member having mating coupling members for releasably coupling the vertically extending member to the strainer member, said vertically extending member being adjustably disposed with respect to the arm such that the strainer member will receive debris floating on the surface of the liquid as the liquid circulates in the pool, said mating coupling member comprising quick disconnect means on the vertically extending member and the strainer member, such that said strainer member having said quick disconnect means can be removed from said arm when straining has been completed, so that the strainer member can be removed from the container of liquid and used releasably secured with said quick disconnect means to a pole having corresponding coupling means for use in manual straining of said pool of liquid, and further wherein said arm extending interiorly is flexible such that said arm can be bent so as to adjust the vertical and horizontal position of said strainer member.

38. Apparatus for removing floating debris from the surface of a pool of liquid disposed in a container comprising:

a bracket constructed and arranged to be fastened adjacent a wall of the container and having an arm extending interiorly over the pool of liquid, said arm comprising a member having an opening, the opening having an area disposed in a plane substantially parallel to the surface of the pool of liquid, the opening receiving a shaft of a strainer member, the strainer member comprising a net through which the liquid flows during circulation of the liquid, the shaft of the strainer member and the member having the opening comprising mating coupling means for releasably coupling the strainer member to the arm such that the shaft of the strainer member is disposed substantially vertically with the strainer member being disposed in a substantially vertical plane substantially perpendicular to a side of the container, said member having the opening being adjustably disposed with respect to the surface of the pool of liquid such that the net will receive debris floating on the surface of the liquid as the liquid circulates in the pool, said mating coupling means comprising quick disconnect means on the shaft of the strainer member and the member having the opening, such that said strainer member having said quick disconnect means can be removed from said bracket when straining has been completed, so that the strainer member can be removed from the container of liquid and used releasably secured with said quick disconnect means to a pole having corresponding coupling means for use in manual straining of said pool of liquid.

39. The apparatus recited in claim 38, wherein said arm extending interiorly over the pool of liquid is flexible such that said arm can be bent so as to adjust the vertical and horizontal position of said strainer member.

40. A bracket constructed and arranged for receiving a strainer member for removing floating debris from the surface of a pool of liquid disposed in a container comprising:

an arm constructed and arranged adapted to be fastened adjacent a wall of the container and extending interiorly over the pool of liquid, said arm comprising a member having an opening, the opening having an area disposed in a plane substantially parallel to the surface of the pool of liquid, the opening constructed and arranged to receive a shaft of the strainer member, the strainer member comprising a net through which the liquid will flow during circulation of the liquid, the member having the opening having a coupling means constructed and arranged to receive a mating coupling means of the shaft of the strainer member, the coupling means of the shaft being constructed and arranged for releasably coupling the strainer member to the arm such that the shaft of the strainer member may be disposed substantially vertically with the strainer member being disposed in a substantially vertical plane substantially perpendicular to a side of the container, said member having the opening being adjustably disposed with respect to the surface of the pool of liquid such that the net which it is constructed and arranged to receive will receive debris floating on the surface of the liquid as the liquid circulates in the pool, said coupling means on the member having the opening comprising quick disconnect means such that said strainer member having said quick disconnect means constructed and arranged to be received in the member having the opening, so that the strainer member can be removed from said arm when straining has been completed, and used releasably secured with said quick disconnect means to a pole having corresponding coupling means for use in manual straining of said pool of liquid.

41. The bracket recited in claim 40, wherein said arm extending interiorly over the pool of liquid is flexible such that said arm can be bent so as to adjust the vertical and horizontal position of said strainer member.

* * * * *